Sept. 26, 1939.　　　　T. E. FOULKES　　　　2,174,260
MEANS FOR STORING ARTICLES IN WAREROOMS, AND THE LIKE
Filed Feb. 16, 1938　　　4 Sheets-Sheet 4

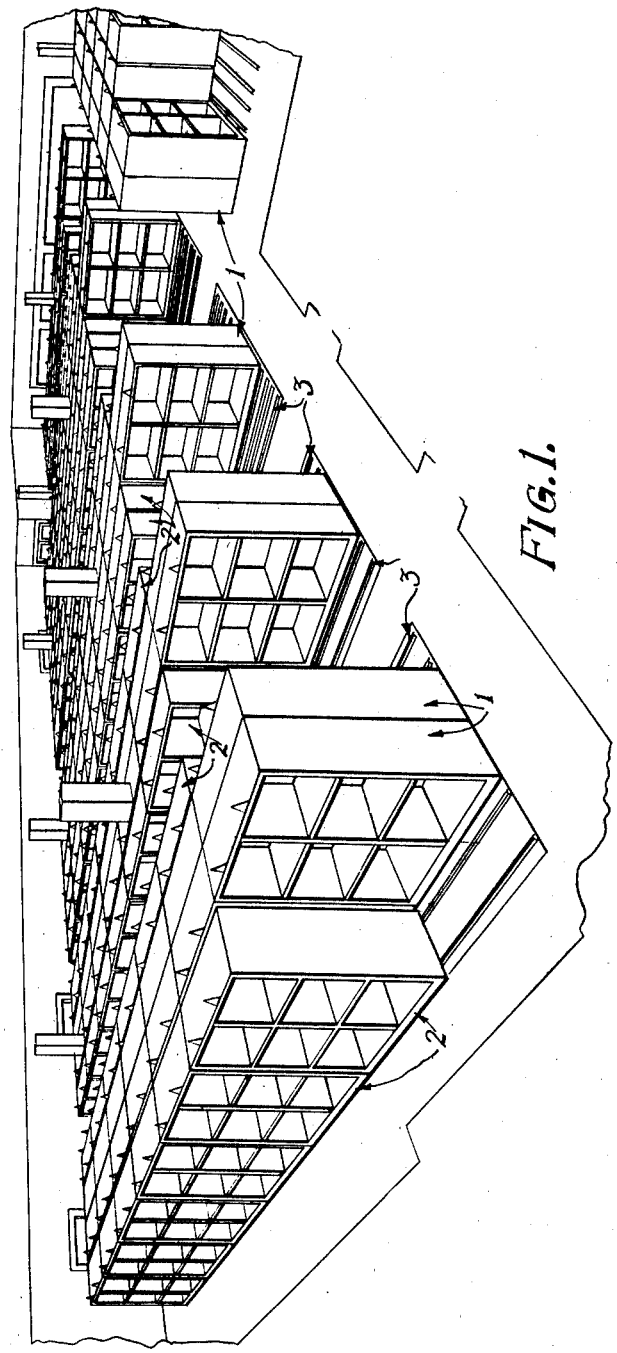

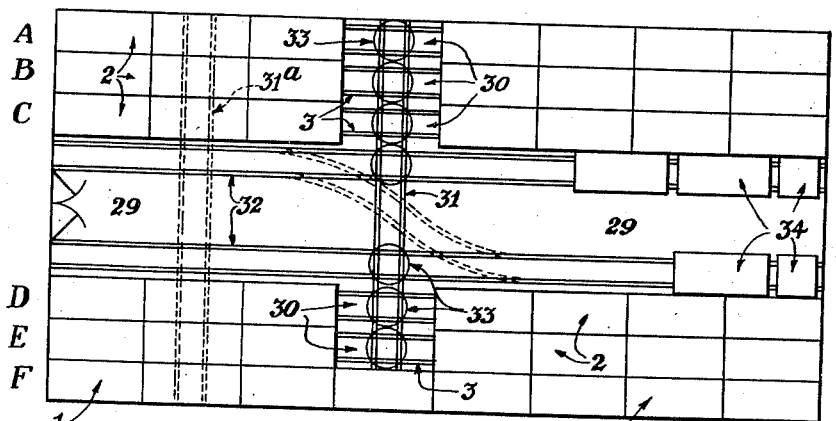
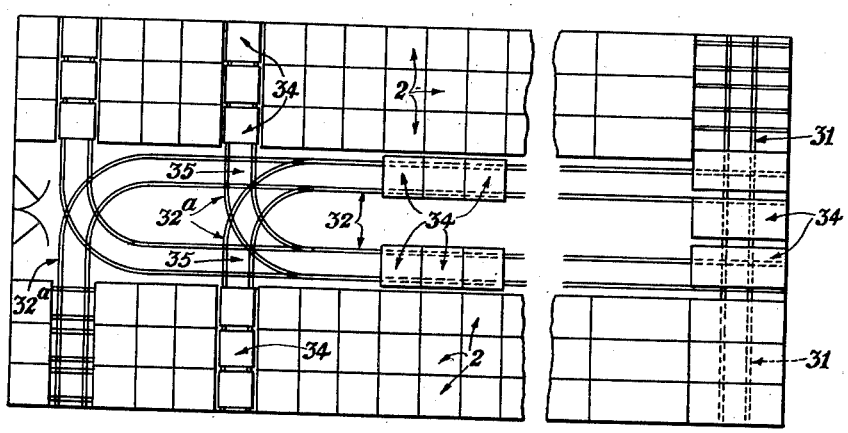
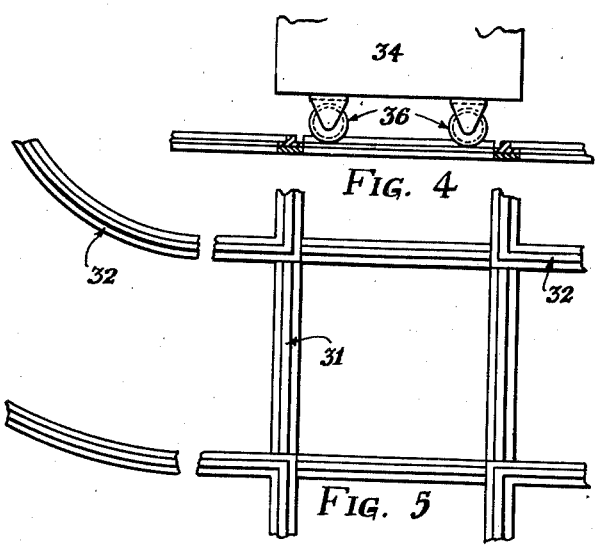

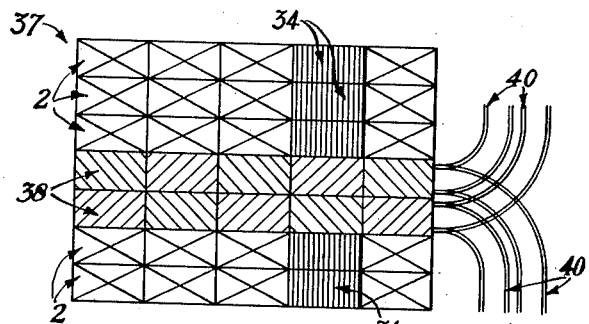
FIG. 6
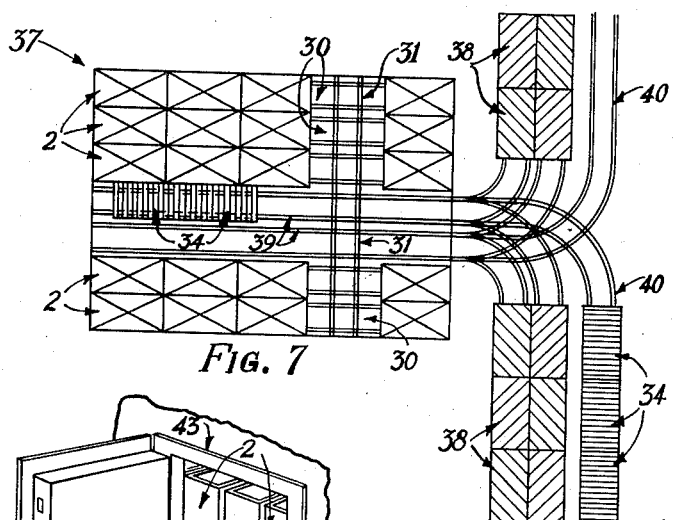
FIG. 7
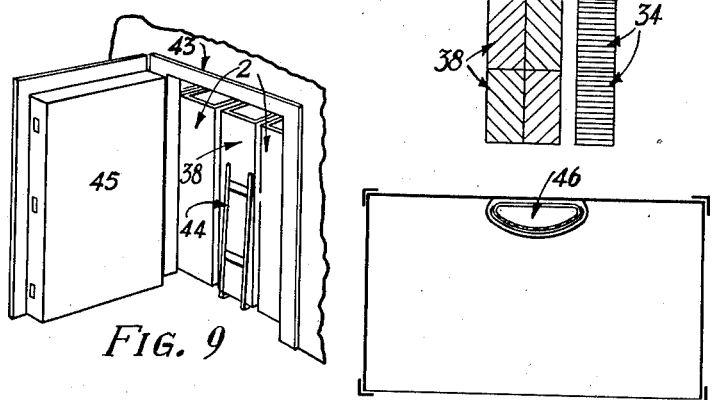
FIG. 9
FIG. 10

Inventor:
Thomas E. Foulkes
By his Attorney:
Walter Gunn.

Patented Sept. 26, 1939

2,174,260

UNITED STATES PATENT OFFICE 2,174,260

MEANS FOR STORING ARTICLES IN WARE-ROOMS, AND THE LIKE

Thomas Edward Foulkes, London, England

Application February 16, 1938, Serial No. 190,791
In Great Britain March 14, 1936

6 Claims. (Cl. 214—16)

The invention is in part a continuation of my earlier application for patent, No. 130,065 filed March 10, 1937, which matured into Patent No. 2,166,704, July 18, 1939. In this application I have described and claimed a storeroom structure in which there are present a series of fixed storage units, each having a plurality of shelves, the adjacent units being in contact. A second series of similar units are movable and are located parallel with the first units with their backs adjacent the front openings of the first series. The second series is less in extent by at least one unit and may be shifted laterally to expose any of the units of the first series.

The object of the invention is to provide an improved method and apparatus for storing merchandise, library books, and other articles, whereby in any given cubic space, a much greater quantity of the articles may be stored than is possible according to the hitherto-known arrangements, without rendering any of these articles inaccessible. The invention is primarily though not exclusively directed to the equipment of warerooms in which a corridor is sometimes required, say for the passage of a truck, but into which corridor (hereinafter referred to as a "major space") units of shelving may be moved at times from out of the spaces (hereinafter referred to as the "minor space") in the rows of movable units of shelving according to the said earlier application.

A subsidiary object of the invention is to provide improved or alternative constructional arrangements of the movable units of shelving in that they are suspended from overhead rails and tracks instead of being mounted on ground tracks.

Finally, the invention aims also at providing improved fire-protection means whereby, notwithstanding the mobility of the storage members they are always within reach of fire-extinguishing arrangements, which arrangements may be divided so as to operate proportionally with the quantity of articles endangered by the fire.

As in the aforesaid earlier application, any of the movable units may be adapted for power operation, and they may be provided with handles, brakes, dust-covers, fireproof screens, buffers and the like. Also the units may be furnished with any of the means shown in the said earlier application for facilitating the recording and/or indicating of stocks carried by them.

In the accompanying drawings various examples of construction of apparatus are shown, some diagrammatically to illustrate the invention:

Fig. 1 is a perspective view of a ware-room fitted with rows of units of shelving according to the said earlier application.

Fig. 2 is a diagrammatic plan of a ware-room having additional units capable of being moved from a minor space to a major space as above described.

Fig. 3 is a like view to Fig. 2 but illustrating two further forms of the invention, and Figs. 4 and 5 are side elevation and plan respectively illustrating one arrangement of wheels and track for the additional carriers;

Fig. 6 is a plan of a ware-room in which the whole of the floor space is occupied with carrier units; and Fig. 7 is a plan of the same room with the units in the "working" positions;

Fig. 9 is a perspective view to illustrate the adaptation of the invention to a smaller enclosure such as a strong room;

Fig. 10 is a part plan of one form of the improved fire-extinguishing means.

Figure 8:
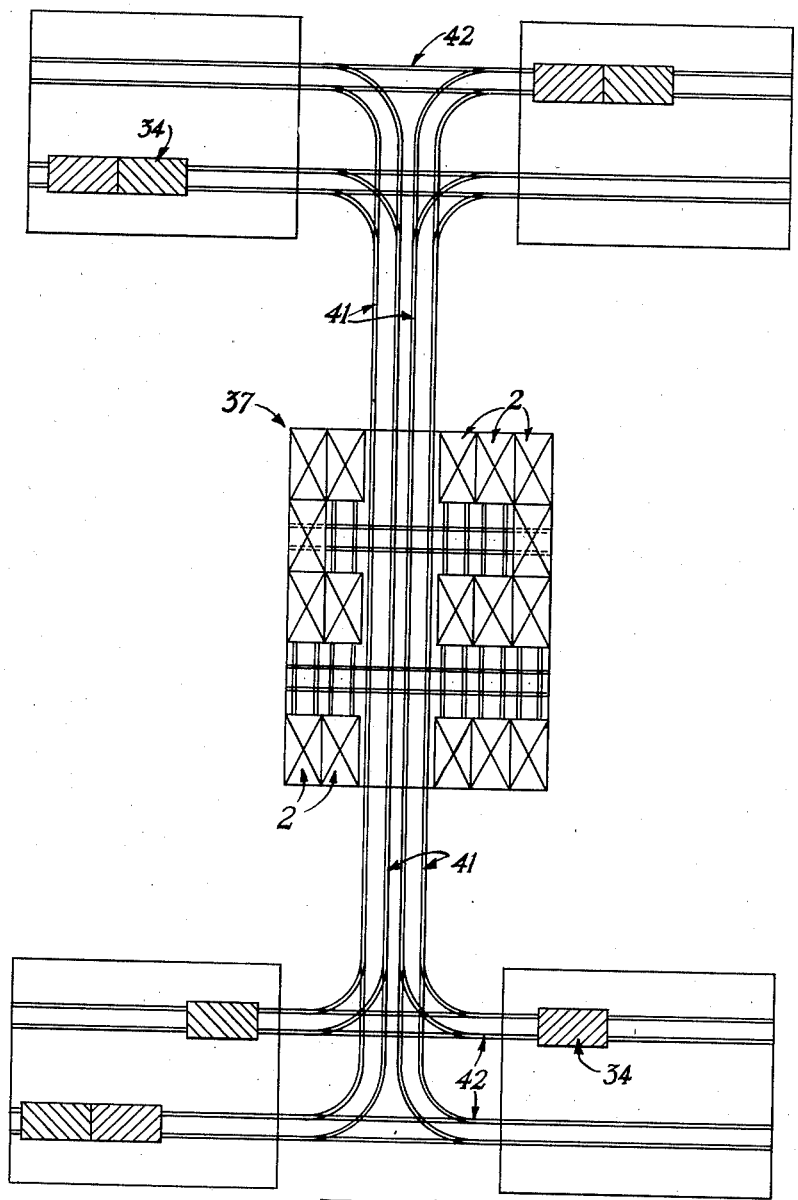
Fig. 8 is a diagram to illustrate the adaptation of the invention to a centralised store in a factory; whilst

Referring to Fig. 2, there are five rows of movable carrier units 2, and one row of fixed units 1, the rows being numbered A, B, C, D, E, F and being arranged three on each side of a central gangway 29 constituting the major space. In each row a space is left equal to the width of one unit, the several spaces, when opposite each other constituting the minor spaces 30. The units 2 run on tracks 3 and are operated according to the above-described example. A further track 31 runs along the minor spaces 30, and across the major space, and at each point of crossing with a track 3, as also at points of crossing with further tracks 32 along the gangway 29, a turntable 33 is provided.

The additional carrier units 34 are shown on the tracks 32. They are of less width than the minor space between the normal units 2 so that when in the minor spaces they will be free to turn on the turn-tables. Alternatively, if the units 34 were rotatably mounted on bogies, only the bogies need rotate with the turntables, and in such event the units 34 could be the full width of the minor space.

Instead of there being only one cross track 31, one or more others may be added, one 31a being shown in dotted lines. The tracks 32 may extend the full length of the gangway 29 or for a part only of the length, and if desired a cross-over track may be laid for the transference of units 34 from one track 32 to another.

When it is desired to be able to change the relative dispositions of the units 2, say by bringing some of the rear ones to the front, as may be done in substituting one season's goods for another's in the front row, all the units 2 may be adapted for movement with a turn-table and for shunting on to any other track.

Referring now to Fig. 3, the turn-tables are dispensed with, and the tracks 32 have extensions 32a (with suitable switch points) extending into the minor space by which the additional units 34 may be transferred to and from the minor space. In such a construction and arrangement, the tracks 32 will be sufficiently far from the front row of units, and/or the size of the units 34 will be so much smaller than the size of the minor space to allow the necessary room for turning the units 34.

In order that the units 34 may be accessible from the front when on the tracks 32, and in effect constitute an extra row of units 2, they will enter the minor space sideways unless a turn-table is provided at the point 35.

The above arrangement is illustrated at the left hand end of Fig. 3 only. At the right hand end of that view, a further arrangement is illustrated, which may be used alone or in conjunction with the arrangements of Figs. 2 or 3. In this further arrangement, the track 31 has no connections with the tracks 32, and the additional units 34 move in one direction only, namely along such track 31, from the minor to the major space and vice versa.

Whilst it is preferred that there be sufficient additional units to fill both minor spaces, there may be sufficient merely to fill one of them, and this applies particularly to the arrangement appearing in the right hand end of Fig. 3.

Referring to Figs. 4 and 5, the units 34 have wheels or rollers 36 which swivel on vertical axes, whereby the carriers may pass from the part 32a of the track to the main length 32 without requiring to turn, and whilst maintaining the same face to the front.

In a large ware-room, where two or more assemblies of units may be separated and at positions where they would not co-operate with each other, a track may be laid for the transference of any of the additional units 34 from one assembly to another.

Referring to Figs. 6 and 7, 37 is the ware-room in which are laterally movable units 2 on tracks, there being a minor space 30 in each rod, and a major space between the two banks of units. As will appear from Fig. 6, the minor spaces 30 are adapted to receive further carrier units 34 moving on a transverse track 31 according to Fig. 2. In accordance with this form of the invention the major space is filled up with still further carrier units 38 moving on the tracks 39.

When all the units 2, 34 and 38 are in the enclosure 37, they completely fill such enclosure and render the units inaccessible. This provides adequate protection against burglary. When the units are required to be accessible, those 38 and 34 are removed, as seen in Fig. 7, to vacate the major and minor spaces either wholly or so as to leave some or all of the units 38 in the major space, as is suggested in Fig. 2. Tracks 40 receive the removed units, and these may be disposed in any suitable arrangement according to the surroundings, and may, as shown in Fig. 7, make the units individually accessible in parallel rows similar to those remaining in the enclosure.

Referring now to Fig. 8, A, B and C represent three departments of a factory in each of which the goods are to undergo a stage of manufacture. These departments are in communication, by the tracks 41, with the centralised store 37, and the separate departments may be in direct communication with each other, as by the tracks 42. In this arrangement all the units may be removable from the store, tracks being laid so that the units 2 and 34, or 2 and 38 may be interchanged with each other, but in all cases so that those remaining after the major and minor spaces have been vacated may be moved along the rows for individual access. Whilst only three separate departments are shown, there may be any number and not necessarily all on one level, since by running the tracks 41 on to a lift or hoist, the units may be transferred to other levels, without preventing their return to the store 37 when required. If one of the departments were a despatch department, the empty units could be transferred therefrom to the initial department to receive the raw materials or partly prepared goods as the case might be.

In Fig. 9 there is pictorially illustrated the entrance to a strong room, or large safe, in which there are units 2 of which the ends of two rows are visible through the doorway 43, and the major space is occupied by removable units 38 of which the end of one is visible through the doorway. In line with the tracks (not shown) on which the units 38 are situated is a hinged section 44 of similar track, capable of being turned up against the end of the units 38, in which position they allow of the door 45 being closed, or of being turned down to lie on the floor, in which position they allow of the units 38 being withdrawn from the room or safe to vacate the major space.

When applied to a smaller safe or other small enclosed space the hinged section of track may be provided with inclined stays to take some of the load when the units 38 are withdrawn. Alternatively the movable sections of track may be completely detachable and be adapted for storage on the top of or between some of the units. In any case such movable section may be in several lengths hinged together so as to fold into a shorter compass.

In the case of a safe or other relatively small enclosure there may be two or more tiers of the movable units, operable independently of each other.

One advantage of this part of the invention is that the safety of the goods as against theft is greatly increased, none of the goods being accessible when all the units are in the enclosure, except those immediately inside the entrance.

Referring now to Fig. 10, there is provided at the back of a carrier unit, which may be a fixed one, or any of the movable ones, a tube-like container 46 of flat oval section, which tube extends from the top to the bottom of the container and has its front wall perforated. The shelves of the unit are cut away at the rear, to accommodate the container. Over the front face of the perforated wall of the container is secured a sheet of fusible material such as metal foil, or impregnated paper, impervious to water or other fire-extinguishing liquid with which the container is filled.

When a fire breaks out in the unit, the fusible layer is melted and allows the fire-repellant liquid to escape from the container.

It will be seen that if a fire occurs in an upper compartment of a unit of shelving, melting the wax or foil in that compartment, only so much liquid will be released as is above the level of the shelf forming the floor of that compartment, whilst if the fire breaks out at a lower part of a unit, a correspondingly larger volume of liquid will be released.

One further advantage of this invention is that with movable units, the removal of them from a ware-room, etc., does not remove them from the fire protection as is the case with sprinklers, the fire-extinguishing means being connected to and movable with the units.

The container may be in communication with a reservoir at the top of and extending over the unit, so as to provide a larger quantity of water, etc., and maintain a head or pressure for a longer time.

The invention is applicable not only to ware-rooms but to shop fittings, stores, vehicles such as delivery vans and railway rolling stock, ships, aeroplanes, submarines, hospital stores, libraries, banks, and any other place where goods are required to be stored in a concentrated form but in accessible positions.

What I claim is:

1. A storeroom construction adapted for the compact storage of merchandise comprising a floor, parallel walls defining a storeroom, a series of storage units along each of said walls, each of said units having a series of shelves and a front opening, the backs of said units being against said walls with the adjacent units in lateral contact, whereby all of said units are accessible from the front, a relatively long major gangway space between the units of each wall, at least a second series of similar units adjacent each of said first series and parallel thereto and substantially in contact therewith and less in extent than said first series, thereby providing a minor space in each of said movable series of units, said minor space being at least as wide as one unit, parallel longitudinal sets of tracks on which said series of units are mounted for movement, and a set of transverse tracks connecting said parallel longitudinal sets of tracks.

2. A storeroom construction adapted for the compact storage of merchandise comprising a floor, parallel walls defining a storeroom, a series of storage units along each of said walls, each of said units having a series of shelves and a front opening, the backs of said units being against said walls with the adjacent units in lateral contact, whereby all of said units are accessible from the front, a relatively long major gangway space between the units of each wall, at least a second series of similar units adjacent each of said first series and parallel thereto and substantially in contact therewith and less in extent than said first series, thereby providing a minor space in each of said movable series of units, said minor space being at least as wide as one unit, at least one of the series of units against a wall being fixed and having no minor space, parallel longitudinal sets of tracks on which said series of units are mounted for movement, and a set of transverse tracks connecting said parallel longitudinal sets of tracks.

3. A storeroom construction adapted for the compact storage of merchandise comprising a floor, parallel walls defining a storeroom, a series of storage units along each of said walls, each of said units having a series of shelves and a front opening, the backs of said units being against said walls with the adjacent units in lateral contact, whereby all of said units are accessible from the front, a relatively long major gangway space between the units of each wall, at least a second series of similar units adjacent each of said first series and parallel thereto and substantially in contact therewith and less in extent than said first series, thereby providing a minor space in each of said movable series of units, said minor space being at least as wide as one unit, parallel longitudinal sets of tracks on which said series of units are mounted for movement, and a set of transverse tracks connecting said parallel longitudinal sets of tracks, an additional set of tracks in the major space adapted to transport and to store movable units, said tracks being interlinked with the aforementioned tracks.

4. A storeroom construction adapted for the compact storage of merchandise comprising a floor, parallel walls defining a storeroom, a series of storage units along each of said walls, each of said units having a series of shelves and a front opening, the backs of said units being against said walls with the adjacent units in lateral contact, whereby all of said units are accessible from the front, a relatively long major gangway space between the units of each wall, at least a second series of similar units adjacent each of said first series and parallel thereto and substantially in contact therewith and less in extent than said first series, thereby providing a minor space in each of said movable series of units, said minor space being at least as wide as one unit, parallel longitudinal sets of tracks on which said series of units are mounted for movement, and a set of transverse tracks connecting said parallel longitudinal sets of tracks, and turntables at the crossing of the longitudinal and transverse tracks.

5. A storeroom construction adapted for the compact storage of merchandise comprising a floor, parallel walls defining a storeroom, a series of storage units along each of said walls, each of said units having a series of shelves and a front opening, the backs of said units being against said walls with the adjacent units in lateral contact, whereby all of said units are accessible from the front, a relatively long major gangway space between the units of each wall, at least a second series of similar units adjacent each of said first series and parallel thereto and substantially in contact therewith and less in extent than said first series, thereby providing a minor space in each of said movable series of units, said minor space being at least as wide as one unit, parallel longitudinal sets of tracks on which said series of units are mounted for movement, and a set of transverse tracks connecting said parallel longitudinal sets of tracks, an additional set of tracks in the major space adapted to transport and to store movable units, said tracks being interlinked with the aforementioned tracks, the front openings of the units on the major space tracks facing said space and such units being adapted to be stored in said minor spaces, the tracks in the major space being continued outside of the storeroom, whereby said units may be stored so as to completely fill the major and minor spaces.

6. A storeroom construction adapted for the compact storage of merchandise comprising a floor, parallel walls defining a storeroom, a series of storage units along each of said walls, each of said units having a series of shelves and a front opening, the backs of said units being against said walls with the adjacent units in lateral contact, whereby all of said units are accessible from the front, a relatively long major gangway space between the units of each wall, at least a second series of similar units adjacent each of said first series and parallel thereto and substantially in contact therewith and less in extent than said first series, thereby providing a minor spaced in each of said movable series of units, said minor space being at least as wide as one unit, parallel longitudinal sets of tracks on which said series of units are mounted for movement, and a set of transverse tracks connecting said parallel longitudinal sets of tracks, an additional set of tracks in the major space adapted to transport and to store movable units, said tracks being interlinked with the aforementioned tracks, all of the longitudinal and transverse tracks being provided with interlinking means to allow transfer of units from any set of tracks to any other.

THOMAS EDWARD FOULKES.